United States Patent
Kluczynski et al.

[11] Patent Number: 5,330,848
[45] Date of Patent: Jul. 19, 1994

[54] RESONATOR BODY FOR DRUMS

[75] Inventors: Roman Kluczynski, Bad Berleburg; Johannes Lutter, Bad Berleburg 3-Wingeshausen; Werner Beuter; Horst Treude, both of Bad Berleburg-Wingeshausen; Heinz Burkert, Bad Berleburg/Aue, all of Fed. Rep. of Germany

[73] Assignee: Sonor Johs. Link GmbH

[21] Appl. No.: 952,243

[22] Filed: Sep. 28, 1992

[30] Foreign Application Priority Data

Sep. 28, 1992 [DE] Fed. Rep. of Germany ....... 4132366

[51] Int. Cl.$^5$ ............................................. B32B 9/00
[52] U.S. Cl. ........................................ 428/537.1; 84/13; 84/84; 84/104; 84/411 R; 84/423 R; 29/169.5
[58] Field of Search ............... 84/104, 84, 13, 411 R, 84/423 R, DIG. 21; 29/169.5; 428/537.1

[56] References Cited

U.S. PATENT DOCUMENTS

| | | | |
|---|---|---|---|
| 1,381,494 | 6/1921 | Olsen | 84/411 R |
| 1,465,215 | 8/1923 | Hall | 84/411 |

FOREIGN PATENT DOCUMENTS

| | | |
|---|---|---|
| 8114194 | 4/1982 | Fed. Rep. of Germany . |
| 8220018 | 10/1982 | Fed. Rep. of Germany . |
| 8302819 | 7/1983 | Fed. Rep. of Germany . |
| 8809611 | 12/1988 | Fed. Rep. of Germany . |
| 8812966 | 5/1989 | Fed. Rep. of Germany . |

Primary Examiner—Patrick J. Ryan
Assistant Examiner—Abraham Bahta
Attorney, Agent, or Firm—Feiereisen & Kueffner

[57] ABSTRACT

A resonator body for musical drum instruments is formed by shaping and gluing together several superimposed material layers, particularly wood veneer layers or plywood layers. The resonator body has the shape of a hollow cylinder. Abutting edges of the individual material layers extend in the direction of the resonator body axis and the abutting edges of the individual material layers are offset relative to each other in circumferential direction of the hollow cylinder. In order to ensure that the abutting edges are permanently and securely held together, the abutting edges of at least the outer material layer, preferably of all material layers, have contours which are toothed and complementary relative to each other and inter-engage in circumferential direction of the hollow cylinder.

14 Claims, 3 Drawing Sheets

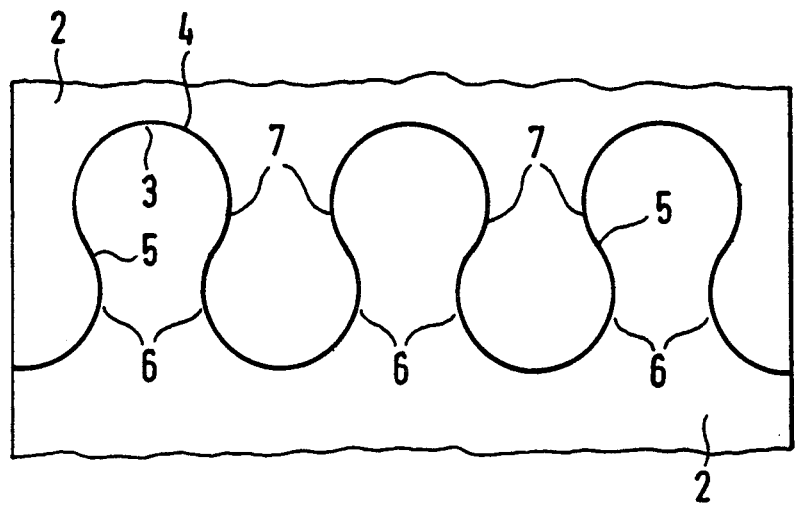
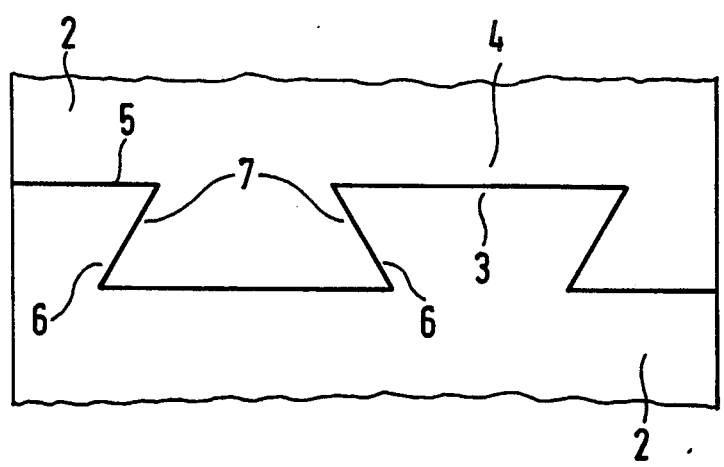

5,330,848

RESONATOR BODY FOR DRUMS

BACKGROUND OF THE INVENTION

1. Field of the Invention

The present invention relates to a resonator body for musical drum instruments. The resonator body is formed by shaping and gluing together several super-imposed material layers, particularly wood layers or plywood layers. The resonator body has the shape of a hollow cylinder. The abutting edges of the individual material layers extending in the direction of the body axis are offset relative to each other in circumferential direction of the hollow cylinder.

2. Description of the Related Art

In previously known resonator bodies of the above-described type, the abutting edges of each layer form seams which extend along straight lines and parallel to the body axis.

In resonator bodies which are not provided on the outer side thereof with a decorative plastic layer, but whose surface is formed by a varnished fine wood veneer, there may in rare cases be the disadvantage that the seam formed by the abutting edges of the outer material layer breaks open and that, as a result, not only the appearance of the resonator body is negatively affected, but also the sound behavior of the musical drum instrument is undesirably impaired.

SUMMARY OF THE INVENTION

Therefore, it is the primary object of the present invention to provide a resonator body of the above-described type in which the above-mentioned disadvantages do not occur. Thus, a resonator body is to be provided in which it is ensured that the connecting seam formed by the abutting edges of each material layer are permanently and securely held together.

In accordance with the present invention, the two abutting edges of at least the outer material layer, but preferably of all material layers, have contours which are of complimentary toothed configuration and engaging each other in circumferential direction of the hollow cylinder.

It has been found that the measure according to the present invention substantially improves the cohesion of the seams, so that the tendency of undesirable breaking of the seams is essentially eliminated.

In accordance with a useful feature according to the present invention, the abutting edges are arch-shaped at least over portions thereof. The edges may be, for example, wave-shaped or tongue-shaped.

In accordance with another feature of the present invention, the abutting edges may also have toothed portions defined by straight lines, for example, toothed portions formed by triangles, rectangles or trapezoids.

In accordance with a particularly advantageous feature of the present invention, the abutting edges have undercut portions which engage in each other in a locking manner when the seam is formed. In this manner, stresses in circumferential direction can be absorbed in a particularly advantageous manner and can no longer lead to breaking of the seams.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWING

In the Drawing:

FIGS. 3 to 9 show various embodiments of the seams between the abutting edges of individual material layers of the resonator body.

DESCRIPTION OF THE PREFERRED EMBODIMENTS

Figure 1:
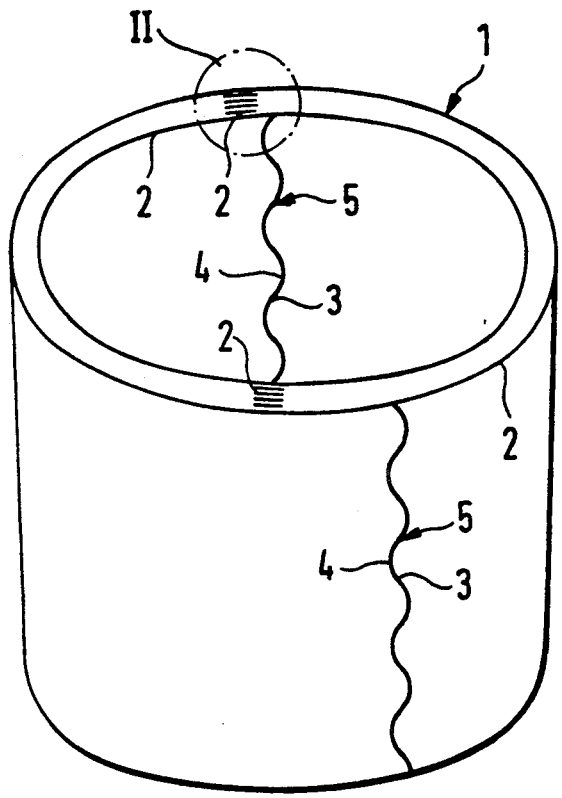
FIG. 1 is a schematic perspective view of a hollow cylinder forming a resonator body for musical drum instruments.

FIG. 1 of the drawings shows a resonator body 1 for a musical drum instrument. The resonator drum I has the shape of a hollow cylinder. The resonator body 1 is manufactured by shaping and gluing together several super-imposed material layers 2, as particularly clearly shown in FIG. 2 of the drawing. The material layers 2 may be composed of wood layers (veneers) or of plywood layers.

Each material layer 2 has abutting edges 3 and 4 which together form a connecting seam 5. The connecting seam 5 extends essentially in the direction of the resonator body axis, as illustrated in FIG. i with respect to the inner and the outer material layers 2. The individual material layers 2, for example, veneer or plywood layers, are usually placed one on top of the other and glued together to form the resonator body in such a way that the seams of the individual material layers formed by the abutting edges 3 and 4 are offset relative to each other in circumferential direction of the hollow cylinder, as illustrated in FIG. 2 with respect to the inner and the outer material layers 2.

Figure 2:
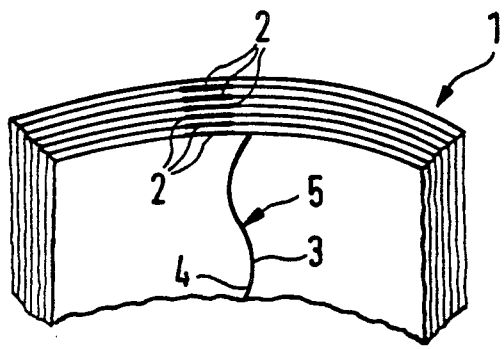
FIG. 2 shows on a larger scale the detail II of FIG. 1.

A significant feature of the resonator body 1 illustrated in FIGS. 1 and 2 of the drawing is the fact that the seams 5 formed by the abutting edges 3 and 4 of the individual material layers 2 do not extend along a straight line and exactly parallel to the resonator body axis. Rather, the abutting edges 3 and 4 of the seams 5 have contours of toothed configuration which are complementary relative to each other and engage into each other in circumferential direction of the hollow cylinder.

The contours of the inter-engaging abutting edges 3 and 4 may have a variety of shapes.

Figure 3:
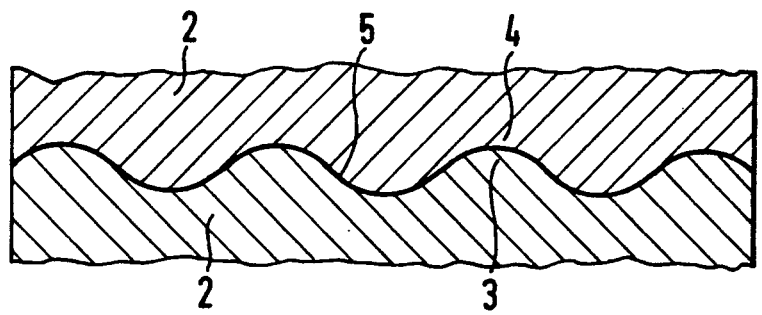

Thus, in the embodiment of the invention illustrated in FIGS. 1 to 3 of the drawing, the butt-jointed edges 3 and 4 of each material layer forming the connecting seam 5 have an exclusively arch-shaped contour, i.e. a flat wave-shaped contour, so that the completed connecting seam 5 also has a flat wave-shaped configuration.

Figure 4:
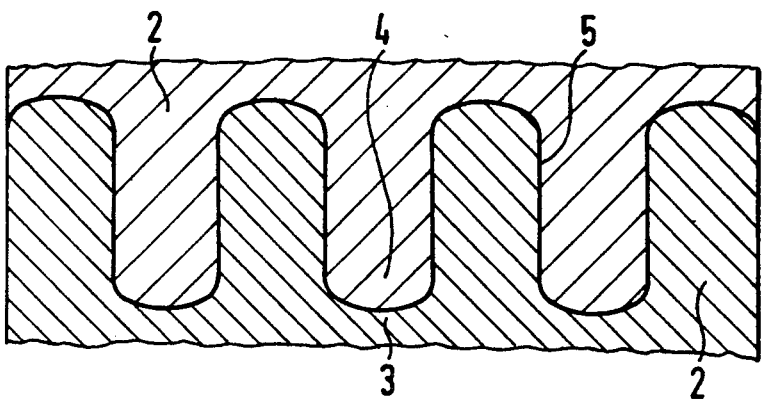

FIG. 4 of the drawing shows an embodiment of the invention which differs from that of FIG. 3. In this case, the abutting edges 3 and 4 of the material layer 2 which form the connecting seam 5 each have alternatingly arch-shaped portions and straight-line portions and, as a result, have a relatively elongated contour, so that tongue-shaped portions alternate with indentations having a complementary shape. It has been found useful if the tongue-shaped portions and the indentations each have a length or depth which corresponds to twice the width thereof, as can be clearly seen in FIG. 4 of the drawing.

Figure 5:
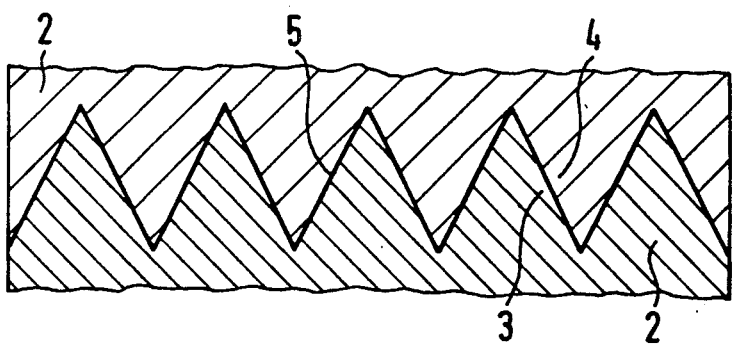

FIG. 5 of the drawing shows an embodiment of the connecting seam 5 of the material layer 2 which is defined by abutting edges 3 and 4 formed by straight lines. The abutting edges 3 and 4 each have zigzag-shaped or triangular toothed portions which fit alternatingly or complementary into each other. The depth of relative engagement of the zigzag-shaped or triangular toothed portions preferably corresponds approximately to the width of the base of each individual triangular contour.

Figure 6:
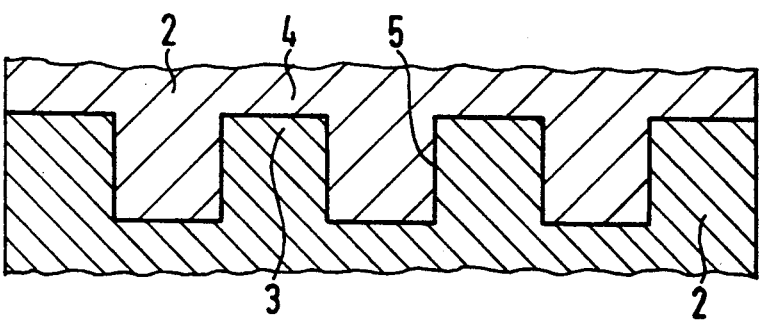

As shown in FIG. 6 of the drawing, abutting edges 3 and 4 with toothed portions defined by straight lines can also be formed in such a way that the toothed portions have rectangular or square shapes. In this case, not only the front lines and the base lines of the toothed portions extend parallel to each other, but the borderlines of the toothed portions extending vertically with respect to each toothed portion extend at a right angle relative to the base lines and the front lines.

Of course, contrary to the embodiment shown in FIG. 6, it is also possible that the toothed portions of the abutting edges 3 and 4 are trapezoidal shaped, wherein the borderlines of the toothed portions extending essentially in vertical direction thereof are provided with an appropriate inclination.

Figure 7:
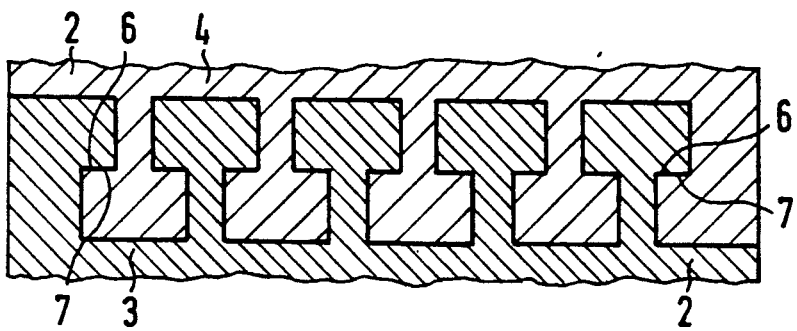

Particularly useful embodiments of the contours of the abutting edges 3 and 4 of the material layers 2 are illustrated in FIGS. 7 to 9 of the drawing. In these embodiments, the abutting edges 3 and 4 have special undercut portions 6 and 7 which engage into each other in a locking manner when the connecting seam 5 is formed. Also in this case, various possibilities for the shapes of the contours of the abutting edges 3 and 4 exist. In the embodiment of FIG. 7, the toothed portions with the undercut portions 6 and 7 are provided with an approximately T-shaped or hammerhead-shaped contour and have border edges defined by straight lines, while the embodiment of FIG. 8 of the drawing has undercut portions 6 and 7 formed by dovetail-shaped toothed portions.

Finally, FIG. 9 shows that it is possible to provide toothed portions as undercut portions 6 and 7 which are continuously arch-shaped at the abutting edges 3 and 4.

The connecting seam 5 constructed between the abutting edges 3 and 4 in accordance with the embodiments of FIGS. 7 to 9 provides the advantage that the material layer 2 itself directly produces a positively engaging and locking connection, so that glue applied to the connecting seam 5 only has to serve the purpose of securing the complementary inter-engaged position of the abutting edges. However, the glue does not have to absorb forces between the adjacent abutting edges 3 and 4 of the respective material layers which would tend to open the connecting seam 5.

It should be understood that the preferred embodiments and examples described are for illustrative purposes only and are not to be construed as limiting the scope of the present invention which is properly delineated only in the appended claims.

What is claimed is:

1. A resonator body for a musical instrument, comprising a plurality of shaped and glued-together material layers including an outer layer, the resonator body having the shape of a hollow cylinder having an axis and a circumference, wherein the material layers are superimposed on each other in radial direction and the material layers each have two abutting edges forming connecting seams extending in direction of the axis of the hollow cylinder, the connecting seams of the material layers being offset relative to each other in circumferential direction of the hollow cylinder, the abutting edges of at least the outer material layer having contours of complementary toothed configurations and engaging into each other in circumferential direction of the hollow cylinder, such that the connecting seam formed by the abutting edges of at least the outer material layer is non-linear.

2. The resonator body according to claim 1, wherein the material layers are wood veneer layers or plywood layers.

3. The resonator body according to claim 1, wherein all material layers have abutting edges of complementary toothed configuration and engaging into each other in circumferential direction of the hollow cylinder.

4. The resonator body according to claim 1, wherein the abutting edges include toothed portions having an arched shape.

5. The resonator body according to claim 4, wherein the toothed portions are wave-shaped.

6. The resonator body according to claim 4, wherein the toothed portions are tongue-shaped.

7. The resonator body according to claim 1, wherein the abutting edges include toothed portions defined by straight lines.

8. The resonator body according to claim 7, wherein the toothed portions have a triangular shape.

9. The resonator body according to claim 7, wherein the toothed portions have a rectangular shape.

10. The resonator body according to claim 7, wherein the toothed portions have a trapezoidal shape.

11. The resonator body according to claim 1, wherein the abutting edges include undercut portions, wherein the undercut portions of the abutting edges engage into each other so as to be locked together.

12. The resonator body according to claim 11, wherein the undercut portions are T-shaped.

13. The resonator body according to claim 11, wherein the undercut portions are dovetail-shaped.

14. The resonator body according to claim 11, wherein the undercut portions are tongue-shaped.

* * * * *